(12) United States Patent
Kawanishi et al.

(10) Patent No.: US 7,046,887 B2
(45) Date of Patent: *May 16, 2006

(54) POLARIZATION PRESERVING OPTICAL FIBER AND ABSOLUTE SINGLE POLARIZATION OPTICAL FIBER

(75) Inventors: Satoki Kawanishi, Yokohama (JP); Kazunori Suzuki, Yokosuka (JP); Hirokazu Kubota, Yokohama (JP); Masatoshi Tanaka, Itami (JP); Moriyuki Fujita, Itami (JP)

(73) Assignees: Nippon Telegraph and Telephone Corporation, Tokyo (JP); Mitsubishi Cable Industries, Ltd., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/491,068

(22) PCT Filed: Sep. 26, 2002

(86) PCT No.: PCT/JP02/09970

§ 371 (c)(1),
(2), (4) Date: Sep. 24, 2004

(87) PCT Pub. No.: WO03/029854

PCT Pub. Date: Apr. 10, 2003

(65) Prior Publication Data

US 2005/0025441 A1    Feb. 3, 2005

(30) Foreign Application Priority Data

Sep. 27, 2001 (JP) .................. 2001-297979

(51) Int. Cl.
*G02B 6/17* (2006.01)

(52) U.S. Cl. .......................... 385/125; 385/123
(58) Field of Classification Search ......... 385/123–128
See application file for complete search history.

(56) References Cited

U.S. PATENT DOCUMENTS

2001/0026667 A1   10/2001   Kawanishi et al. ......... 385/125
2004/0013379 A1*  1/2004   Johnson et al. ............. 385/125

FOREIGN PATENT DOCUMENTS

WO         WO/49436         8/2000

OTHER PUBLICATIONS

"Polarization maintaining holely optical fiber" (Kawanishi and Oknmoto, 2000 Commtmications Society Conference No. B-10-153 of The Institute of Electronics, Information and Communication Engineers of Japan.*

(Continued)

*Primary Examiner*—Frank G. Font
*Assistant Examiner*—Michael P. Mooney
(74) *Attorney, Agent, or Firm*—Workman Nydegger

(57) ABSTRACT

A polarization-maintaining optical fiber and absolutely single-polarization optical fiber are provided which enable long distance transmission maintaining a polarization state of signal light. The polarization-maintaining optical fiber includes a core, photonic crystal cladding, and jacket. The photonic crystal cladding is divided into four segments by broken lines from the center to the periphery. Among a plurality of grating holes in a pair of segments opposed to each other with respect to the core, the diameter of grating holes close to the core is greater than the diameter of grating holes in another pair of segments opposed with each other, and than a grating constant.

7 Claims, 9 Drawing Sheets

OTHER PUBLICATIONS

S.B. Libori, J. Broeng, E. Knudsen, A. Bjarklev, "High-birefringent photonic crystal fiber," OFC 2001, TuM2, Anaheim (2001).

"Polarization maintaining holey optical fiber" (Kawanishi and Okamoto, 2000 Communications Society Conference No. B-10-153 of The Institute of Electronics, Information and Communication Engineers of Japan.

Suzuki, K. et al., "High-speed bi-directional polarization division multiplexed optical transmission in ultra low-loss (1.3 dB/km) polarization-maintaining photonic crystal fibre", Electronics Letters, Nov. 8, 2001, vol. 37, No. 23, pp. 1399-1401.

A. Ortigosa-Blanch, J.C. Knight, W.J. Wadsworth, J. Arriaga, B.J. Mangan, T.A. Birks, P.St. Russell, "Highly birefringent photonic crystal fibers," Optics Letters, vol. 25, pp. 1325-1327 (2000).

"Low-loss, 2-km-long photonic crystal fiber with zero GVD in the near IR suitable for picosecond pulse propagation at the 800 nm band," (H. Kubota, K. Suzuki, S. Kawanishi, M. Nakazawa, M. Tanaka, and M. Fujita, Tech. Digest of Conference on Lasers and Electro-optics (CLEO), CPD3, (2001).

* cited by examiner

POLARIZATION PRESERVING OPTICAL FIBER AND ABSOLUTE SINGLE POLARIZATION OPTICAL FIBER

TECHNICAL FIELD

The present invention relates to a transmission medium and optical device, and more particularly to a polarization-maintaining optical fiber and absolutely single-polarization optical fiber that are used for an optical communication network and optical signal processing to carry out transmission and multi/demultiplexing of light maintaining a polarization state.

BACKGROUND ART

A polarization-maintaining optical fiber is given a difference between propagation constants of two polarization modes that have linear polarization along two orthogonal principal axes in the core by making the modes of the fiber not be degenerated by applying anisotropy of the stress distribution in a single-mode optical fiber. Since the structure enables the distinction between the two polarization modes, when light that agrees with a particular polarization mode is launched to the optical fiber, the light propagates through the optical fiber maintaining only that polarization mode.

As a typical polarization-maintaining optical fiber, a PANDA fiber is known. The PANDA fiber, however, requires high technology that bores holes through two places in a base material (cladding) of the optical fiber in extremely close proximity to the core region in the fabrication process, and that fills the holes with a stress-applying material to form the fiber. In particular, the process of squeezing the stress-applying material into the base material is a major factor of reducing the productivity of the polarization-maintaining optical fiber. For this reason, the PANDA fiber usually costs 100 or more times higher than an ordinary single-mode fiber. In addition, since the propagation constant difference between the two orthogonal polarization modes resulting from the PANDA fiber structure is rather small, it is difficult to reduce the crosstalk between the two modes to less than −30 dB.

Thus, it is difficult for the PANDA fiber to transmit a signal pulse train over a long distance maintaining the single polarization. Accordingly, it is not used as a single polarization transmission path. Considering such difficulties in fabricating the PANDA fiber, optical fibers with claddings with a variety of structures have been developed today.

FIG. 1 is a cross-sectional view showing a structure of a conventional polarization-maintaining optical fiber based on a photonic crystal structure. The polarization-maintaining optical fiber comprises a core region 41, a photonic crystal cladding 42 and a jacket 43. In FIG. 1, the photonic crystal cladding 42 is divided into four segments 42a, 42b, 42c and 42d by broken lines from the center to the periphery.

In the segments 42a, 42b, 42c and 42d, the grating constant Λ of the diffraction grating that consists of grating holes indicated by circles in FIG. 1 is the same throughout the grating. However, the diameter d2 of individual grating holes in the first opposed segments 42a and 42c is greater than the diameter d1 of individual grating holes in the second opposed segments 42b and 42d adjacent to the first opposed segment (d2>d1). Such a structure can bring about the propagation constant difference between x and y directions, thereby being able to implement the polarization maintaining property.

FIG. 2 is a graph illustrating variations in the modal birefringence when varying the ratio of the diameters of the air holes of the polarization-maintaining optical fiber. The detail of the calculation is described in "Polarization maintaining holely optical fiber" (Kawanishi and Okamoto, 2000 Communications Society Conference No. B-10-153 of The Institute of Electronics, Information and Communication Engineers of Japan).

The modal birefringence B is given by the following expression when the propagation constants corresponding to the two perpendicular polarization modes (HE11x mode and HE11y mode) in the fiber are βx and βy.

$$B=(\beta x-\beta y)/k (K \text{ is a wave number})$$

Here, the calculation is carried out using a finite element method.

It is clear from FIG. 2 that the modal birefringence B, a measure of the polarization maintaining property, increases with an increase of the ratio (d2/d1). In addition, the ratio (d2/d1) equal to or greater than two can implement the birefringence equal to or greater than that of the conventional PANDA polarization-maintaining optical fiber (about $5 \times 10^{-4}$ in PANDA). To increase (d2/d1), there is a method of increasing the diameter d2 or decreasing the diameter d1.

As for the polarization-maintaining optical fibers with such a structure, their prototypes and calculation examples are disclosed in the following two documents.

(1) A. Ortigosa-Blanch, J. C. Knight, W. J. Wadsworth, J. Arriaga, B. J. Mangan, T. A. Birks, P. St. Russell "Highly birefringent photonic crystal fibers" Optics Letters, Vol. 25, pp. 1325–1327 (2000); and (2) S. B. Libori, J. Broeng, E. Knudsen, A. Bjarklev, "High-birefringent photonic crystal fiber" OFC 2001, TuM2, Anaheim (2001).

FIGS. 3 and 4 show cross-sectional structures of the polarization-maintaining optical fiber described in the foregoing documents: FIG. 3 shows a picture of an actually fabricated device; and FIG. 4 shows a structure drawn according to calculation values.

In the examples as shown in FIGS. 3 and 4, the diameters d2 of all the grating holes in the diffraction grating are less than the grating constant Λ. In addition, the diameter of the grating holes in a pair of opposed segments with respect to the core region differs from the diameter of the grating holes in another pair of opposed segments, thereby achieving the polarization maintaining characteristic.

In the polarization-maintaining optical fiber as shown in FIGS. 3 and 4, the modal birefringences B at a wavelength 1550 nm (calculation values) are $2.8 \times 10^{-3}$ and $1.5 \times 10^{-3}$, respectively.

However, when the diameter d1 is less than the grating constant as in the case of FIGS. 3 and 4, the optical confinement in the segments is weak, so that the light leaks from the core region to the segments, thereby the optical intensity distribution is distorted. In the worst case, the majority of the optical intensities might present outside of the core region. As a result, the fiber is susceptible to a bending loss, and becomes unusable as the fiber. Accordingly, it is impossible to set the diameter d1 below a certain value.

In addition, the example of FIG. 4 has a structure in which grating holes with a greater diameter deviate from the surrounding diffraction grating to the core region. However, it is difficult to fabricate such a polarization-maintaining optical fiber in practice.

As described above, the conventional polarization-maintaining optical fiber has a problem of having difficulty in implementing the following requirements at the same time: maintaining the polarization state of the signal light; carrying out long distance transmission; and fabricating with ease.

Furthermore, the conventional polarization-maintaining optical fiber allows the two orthogonal polarization modes to present within it. Thus, when the light travels a long distance through the fiber, slight crosstalk arises between the two polarization modes even if the polarization-maintaining optical fiber has the birefringence. Accordingly, it has a problem of inducing a perpendicular component at the output due to the polarization crosstalk, even if polarization state of the input light is set to one of the principal axes of the fiber. In fact, as for the PANDA fiber, the polarization crosstalk becomes a problem when the propagation distance exceeds 20 km.

Therefore an object of the present invention is to provide a polarization-maintaining optical fiber and absolutely single-polarization optical fiber capable of implementing the long distance transmission maintaining the polarization state of the optical signal.

Another object of the present invention to provide an absolutely single-polarization optical fiber enabling only one of the polarization modes to propagate through the fiber by providing a structure for absorbing the other of the polarization modes.

DISCLOSURE OF THE INVENTION

According to the first aspect of the present invention, there is provided a polarization-maintaining optical fiber including a core and a cladding that is disposed about the core and includes grating holes arranged at a predetermined grating constant to confine light within the core, the polarization-maintaining optical fiber is characterized in that: a diameter of a pair of grating holes among the grating holes is greater than a diameter of the remaining grating holes and than the predetermined grating constant, the pair of grating holes being opposed with respect to the core and disposed near the core.

The cladding may be a photonic crystal cladding.

The sum of the diameter of the pair of grating holes and the diameter of the remaining grating holes may be less than twice the predetermined grating constant.

Thus, it can increase the modal birefringence effectively.

According to the second aspect of the present invention, there is provided an absolutely single-polarization optical fiber including a core and a cladding that is disposed about the core and includes grating holes arranged at a predetermined grating constant to confine light within the core, the absolutely single-polarization optical fiber is characterized in that: a diameter of a pair of grating holes among the grating holes is greater than a diameter of the remaining grating holes and than the predetermined grating constant, the pair of grating holes being opposed with respect to the core and disposed near the core, and at least one of the pair of grating holes having its inside coated with a metal film.

According to the third aspect of the present invention, there is provided an absolutely single-polarization optical fiber including a core and a cladding that is disposed about the core and includes grating holes arranged at a predetermined grating constant to confine light within the core, the absolutely single-polarization optical fiber is characterized in that:

a diameter of a pair of grating holes among the grating holes is greater than a diameter of the remaining grating holes and than the predetermined grating constant, the pair of grating holes being opposed with respect to the core and disposed near the core, and at least one of the pair of grating holes having its inside covered with a multilayer composed of two types of media that have different refractive indices and are stacked alternately.

The cladding may be a photonic crystal cladding.

The sum of the diameter of the pair of grating holes and the diameter of the remaining grating holes may be less than twice the predetermined grating constant.

BEST MODE FOR CARRYING OUT THE INVENTION

The best mode for carrying out the invention will now be described with reference to the accompanying drawings to explain the present invention in more detail.

Figure 1:
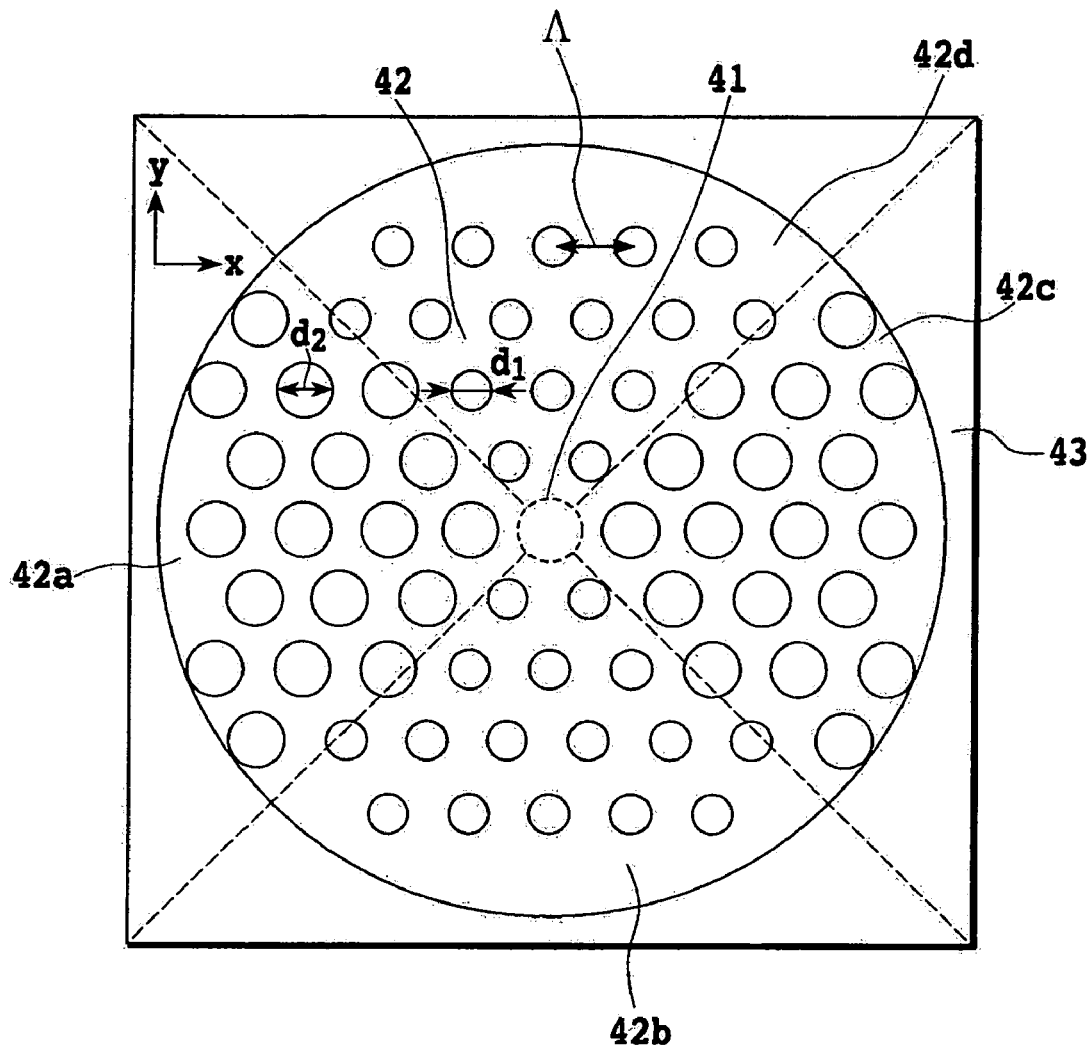
FIG. 1 is a cross-sectional view showing a structure of a conventional polarization-maintaining optical fiber.
Figure 2:
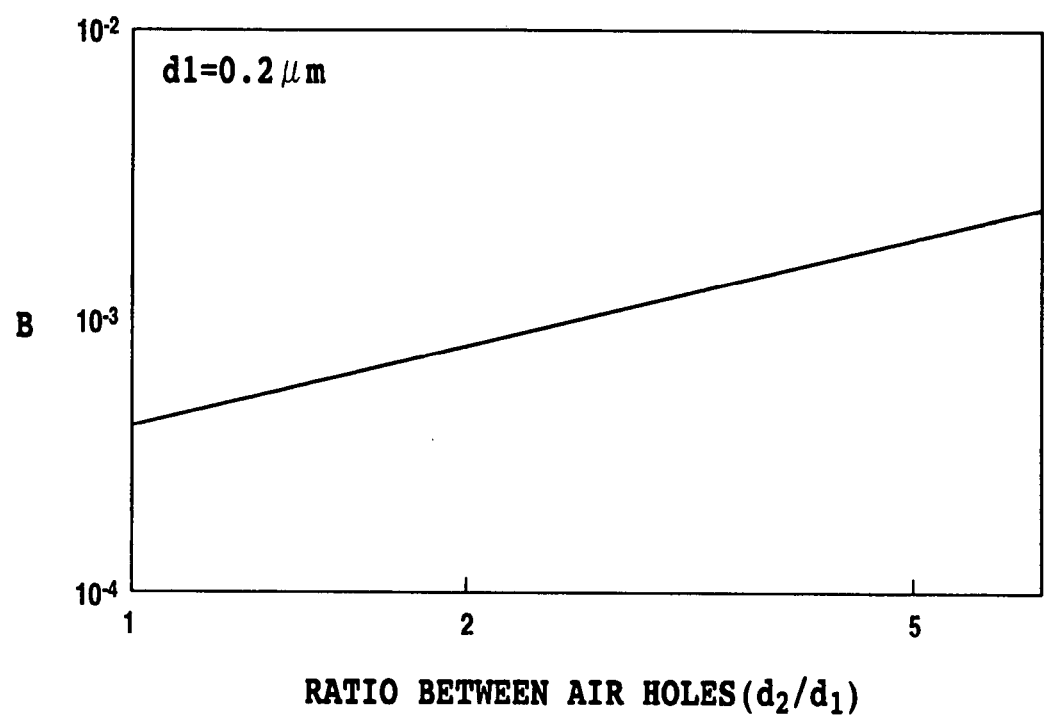
FIG. 2 is a graph illustrating relationships between the ratio of diameters of air holes and the modal birefringence B in the conventional polarization-maintaining optical fiber.
Figure 3:
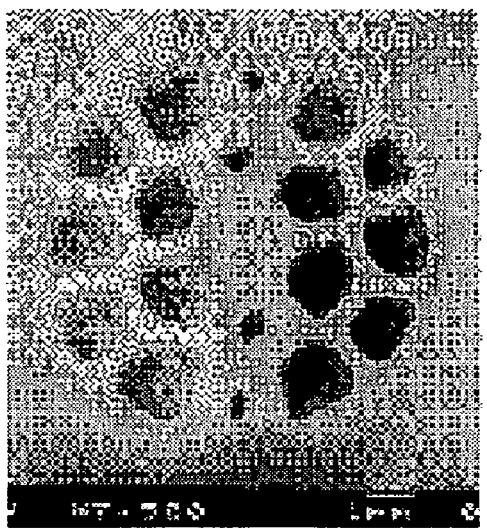
FIG. 3 is a cross-sectional view showing a structure of a polarization-maintaining optical fiber described in the document (1)
Figure 4:
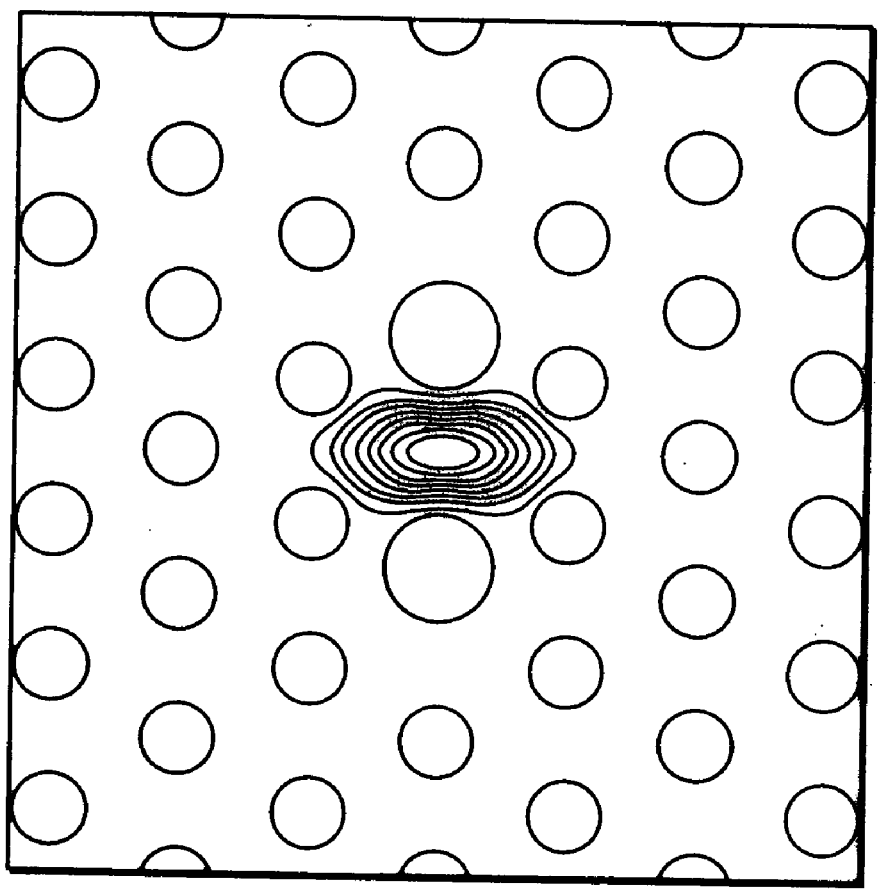
FIG. 4 is a cross-sectional view showing a structure of a polarization-maintaining optical fiber described in the document (2)
Figure 5:
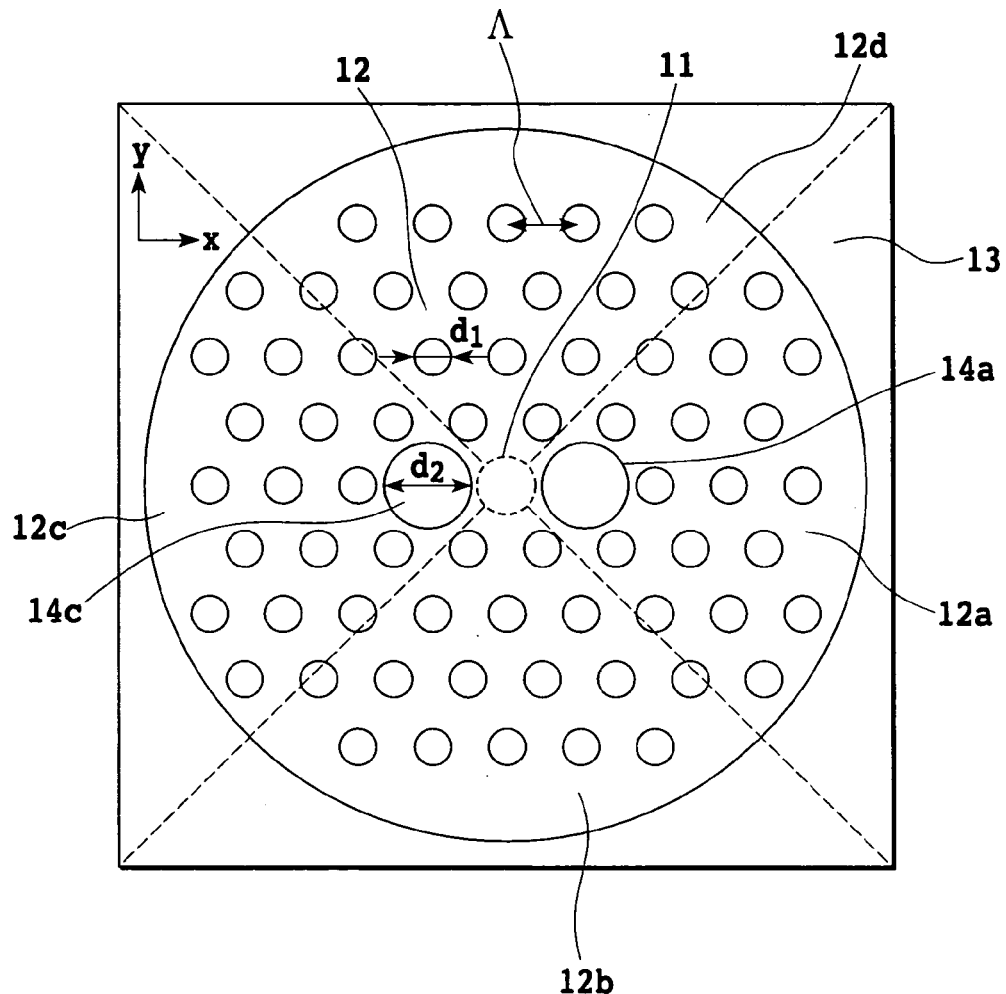
FIG. 5 is a cross-sectional view showing a structure of a polarization-maintaining optical fiber in accordance with the present invention.

FIG. 5 is a cross-sectional view showing a structure of a polarization-maintaining optical fiber in accordance with the present invention. The polarization-maintaining optical fiber comprises a core region 11, a photonic crystal cladding 12, and a jacket 13.

The photonic crystal cladding 12 includes grating holes disposed at a predetermined grating constant $\Lambda$ to confine the light in the core, and consists of four segments 12a, 12b, 12c and 12d divided by broken lines extending from the center to periphery. Here, the diameter d2 of the grating holes 14a and 14c, which are disposed closest the core region 11 among a plurality of grating holes in a pair of segments 12a and 12c opposed to each other with respect to the core region 11, is greater than the diameter d1 of the grating holes of another pair of segments 12b and 12d opposed to each other with respect to the core region 11. In addition, the diameter d2 of the grating holes in the segments 12a and 12c is greater than the grating constant $\Lambda$.

Thus making the diameter d2 of the grating holes 14a and 14c closest to the core region 11 greater than the grating constant Λ enables an increase of the modal birefringence B concerning the x and y directions.

To form the grating holes 14a and 14c with a diameter greater than the grating constant Λ, it is necessary to determine the relationship with the diameter of the other grating holes. In the example of FIG. 5, the following relationship is satisfied.

$$d1+d2<2\Lambda$$

Satisfying the condition can maintain the grating constant Λ in the entire region, thereby enabling the diameter of the two grating holes closest to the core region to be greater than the grating constant Λ without changing the arrangement (center position) of the grating.

Such a polarization-maintaining optical fiber can be fabricated by a known fabrication method of the photonic crystal polarization-maintaining optical fiber such as disclosed in "Low-loss, 2-km-long photonic crystal fiber with zero GVD in the near IR suitable for picosecond pulse propagation at the 800 nm band", (H. Kubota, K. Suzuki, S. Kawanishi, M. Nakazawa, M. Tanaka, and M. Fujita, Tech. Digest of Conference on Lasers and Electro-optics (CLEO), CPD3, 2001).

Figure 6:
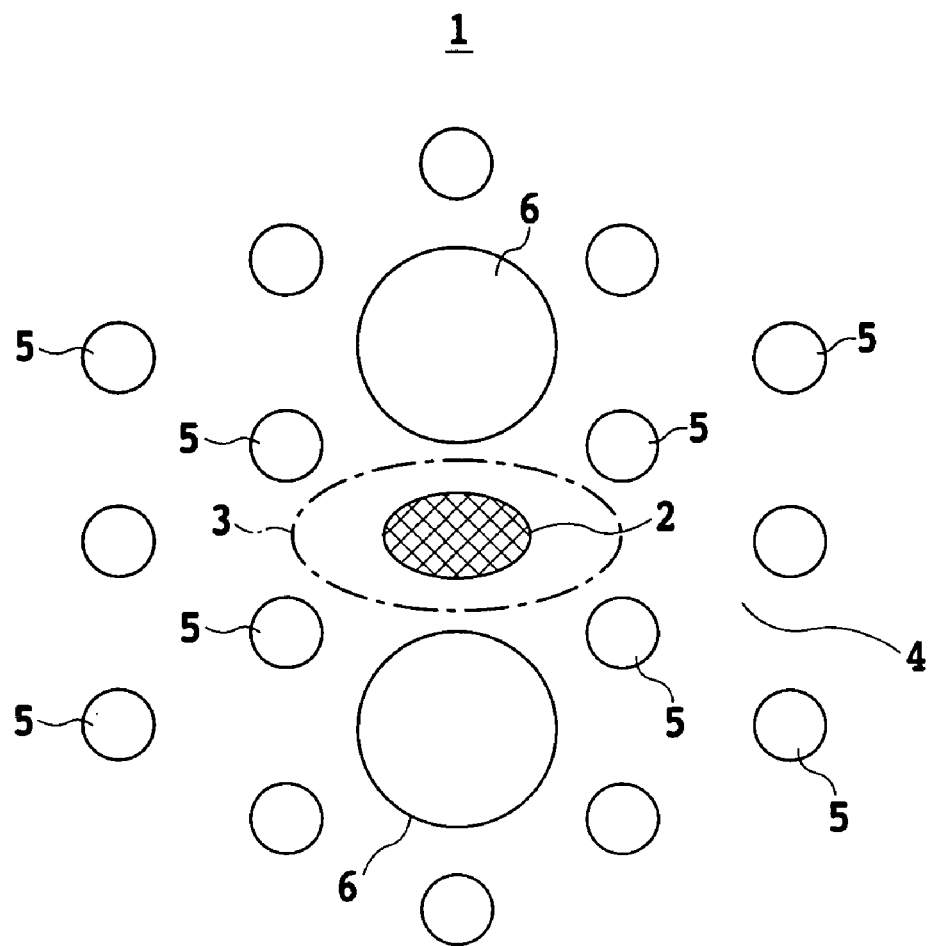
FIG. 6 is a cross-sectional view showing a structure of a polarization-maintaining optical fiber in accordance with the present invention.

FIG. 6 shows a preferred embodiment in accordance with the present invention. It employs a photonic crystal fiber 1 including in an optical transmission region 3 a Ge-doped elliptical core 2 that has a refractive index higher than that of its surroundings, and has a cross section with a flat shape, which causes the polarization maintaining property. In addition, since the slow axis of the optical transmission region 3 and that of the core 2 point the same direction, the polarization plane maintained in the optical transmission region 3 and the polarization plane maintained in the core 2 agree with each other. Accordingly, the polarization maintaining property of the two are superimposed, thereby providing a large polarization maintaining characteristics that cannot be obtained by one of the two.

The flat shape of the optical transmission region 3 and core 2 has a slow axis and a fast axis orthogonal to each other. It is preferable that the slow axis be 1.3–5.0 times longer than the fast axis because it can increase the polarization maintaining characteristic. The flat shape can be mentioned as a narrow shape.

Figure 7:
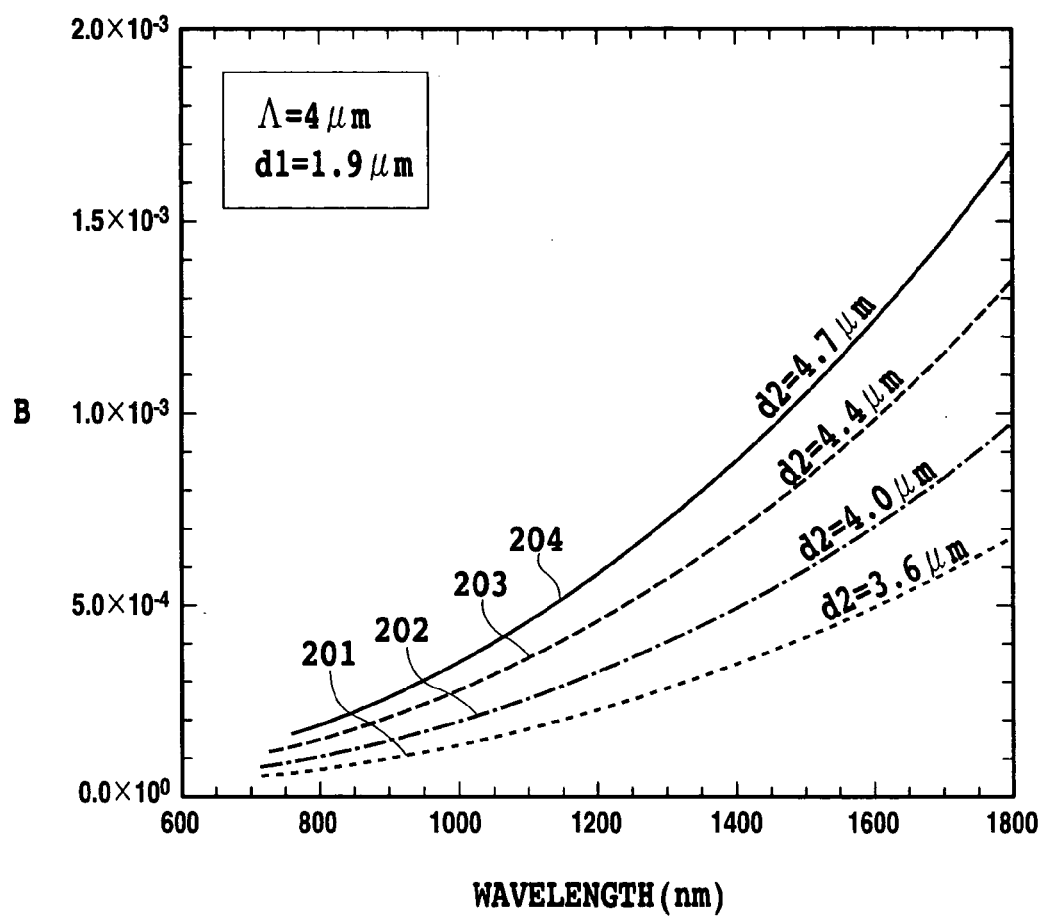
FIG. 7 is a graph illustrating calculation results of the modal birefringence B versus wavelength when varying the diameters of the grating holes near the core region.

FIG. 7 is a graph illustrating calculation results of the modal birefringence B for the wavelength as to the polarization-maintaining optical fiber with the grating holes closest to the core region, which are different in diameter from the other grating holes. In the example of FIG. 7, the grating constant Λ is set at 4 μm, and the diameter d1 of the grating holes in the segments 12b and 12d is set at 1.9 μm. The calculation is carried out with varying the diameter d2 as 3.6 μm, 4.0 μm, 4.4 μm and 4.7 μm. The calculation results are shown by curves 201, 202, 203 and 204. It is seen from this graph that the modal birefringence B increases with an increase in the diameter d2 of the grating holes near the core in the segments 12a and 12c.

Figure 8:
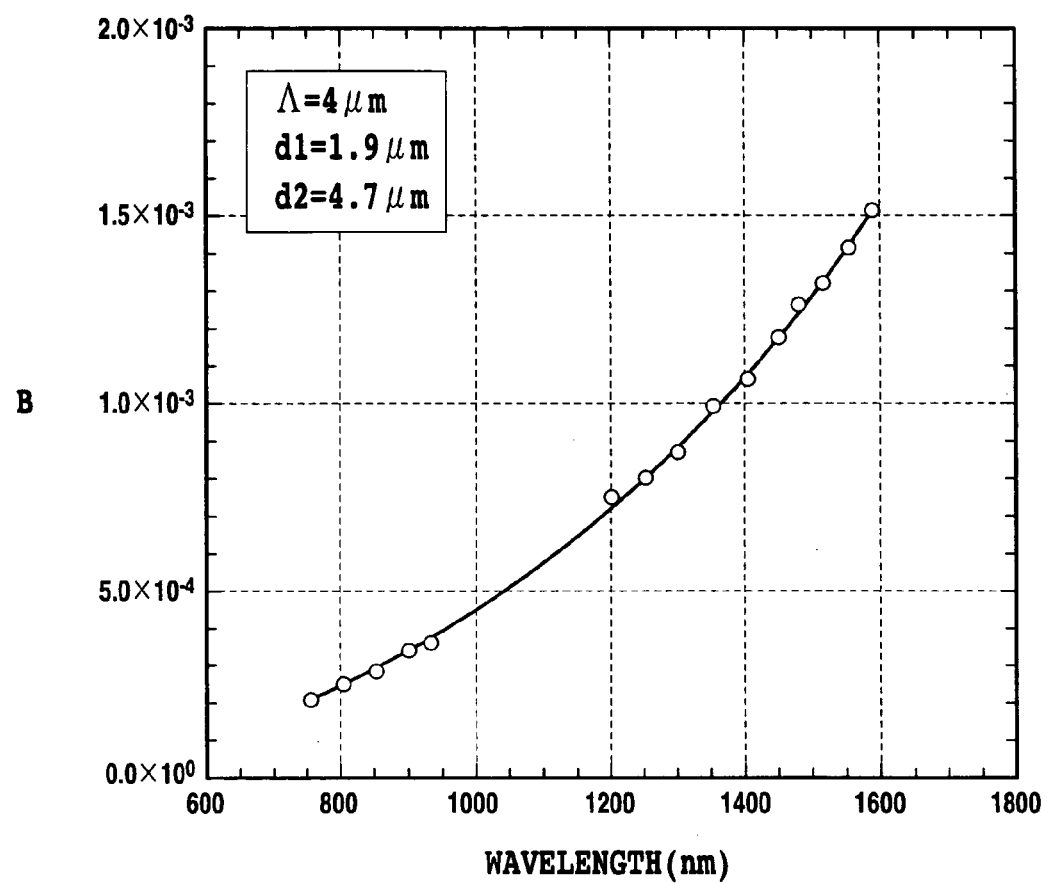
FIG. 8 is a graph illustrating measurement results of the modal birefringence B of a polarization-maintaining optical fiber that is actually fabricated in accordance with the present invention.

FIG. 8 is a graph illustrating measured results of the modal birefringence B for the wavelength of a polarization-maintaining optical fiber in accordance with the present invention. The measurement of FIG. 8 was carried out for a sample polarization-maintaining optical fiber in which the grating constant Λ is 4 μm, the diameter d1 of the grating holes in the segments 12b and 12d is 1.9 μm, and the diameter d2 of the grating holes near the core in the segments 12a and 12c is 4.7 μm.

As is clear from the comparison of FIGS. 7 and 8, the experimental results are in good agreement with the calculated values. In addition, it is seen that the modal birefringence B at the wavelength 1550 nm is $1.4 \times 10^{-3}$, which is greater than that of the conventional technique.

Although the embodiments in accordance with the present invention are described above, the present invention is not limited to the foregoing embodiments, but is applicable to other variations.

For example, one or both of the grating holes 14a and 14c near the core 11 in the segments 12a and 12c of the grating holes as shown in FIG. 5 can have the inside coated with a metal such as aluminum or gold. Fixing the metal inside the grating holes 14a and 14c makes it possible to absorb the polarization with an electric field component perpendicular to the metal surface, thereby enabling only the polarization with the electric field component parallel to the metal surface to propagate through the optical fiber.

Figure 9:
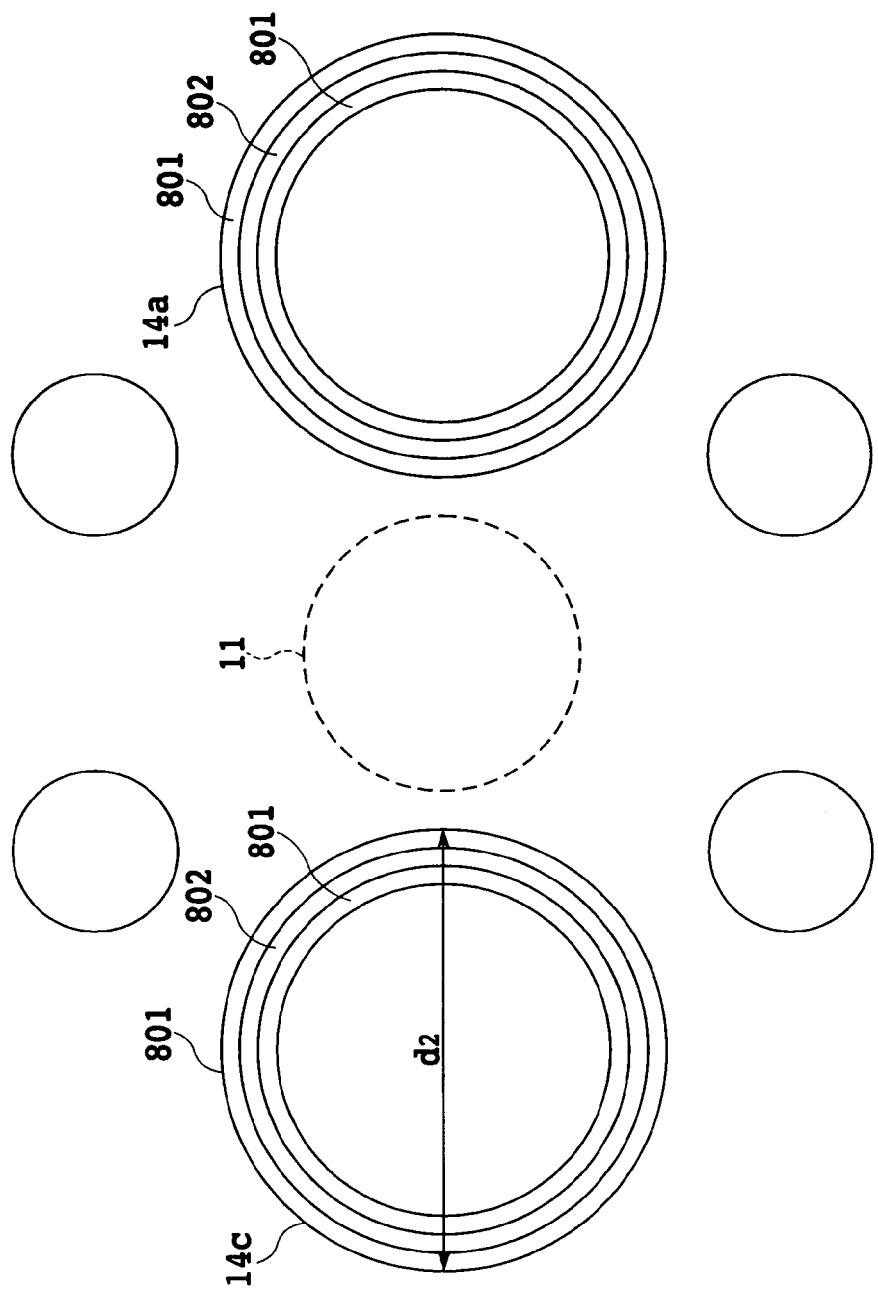
FIG. 9 is a diagram showing part of the cross section of an absolutely single-polarization optical fiber in accordance with the present invention.

Alternatively, as shown in FIG. 9, a multilayer, which consists of two media 801 and 802 with different refractive indices stacked alternately, can be fixed to the inside of the grating holes 14a and 14c near the core 11. With such a structure, it is possible to increase the absorption loss of only one of the polarization modes because the reflectance and transmittance of the light vary depending on the incident optical polarization direction. Thus, only one of the polarization modes propagates through the optical fiber in accordance with the present invention.

Although FIG. 9 shows an example in which both the grating holes 14a and 14c have their inside covered with the multilayer, this is not essential. For example, only one of the grating holes 14a and 14c can have its inside coated with the multilayer.

In this case, the optical fiber in accordance with the present invention becomes an absolutely single-polarization optical fiber that can transmit only one of the polarization modes.

INDUSTRIAL APPLICABILITY

As described above, according to the present invention, the photonic crystal structure near the core is provided with a very large modal birefringence, which enables the suppression of the polarization crosstalk, thereby being able to stabilize the signal light. As a result, the present invention can implement a long distance transmission greater than the conventional polarization-maintaining optical fiber maintaining a signal optical polarization state.

In addition, employing the photonic crystal cladding including the diffraction grating with a specified grating constant makes it possible to fabricate an optical fiber with a large modal birefringence very easily.

Furthermore, providing the structure for absorbing one of the polarization modes in accordance with the present invention enables only one polarization mode to propagate through the optical fiber over a long distance.

What is claimed is:

1. A polarization-maintaining optical fiber including a core and a cladding that is disposed about the core and includes grating holes arranged at a predetermined grating constant to confine light within the core, said polarization-maintaining optical fiber is characterized in that:
a diameter of a pair of grating holes among the grating holes is greater than a diameter of the remaining grating holes and than the predetermined grating constant, said pair of grating holes being opposed with respect to the core and disposed near the core.

2. The polarization-maintaining optical fiber as claimed in claim 1, wherein said cladding is a photonic crystal cladding.

3. The polarization-maintaining optical fiber as claimed in claim 1, wherein a sum of the diameter of said pair of grating holes and the diameter of the remaining grating holes is less than twice the predetermined grating constant.

4. An absolutely single-polarization optical fiber including a core and a cladding that is disposed about the core and includes grating holes arranged at a predetermined grating constant to confine light within the core, said absolutely single-polarization optical fiber is characterized in that:
   a diameter of a pair of grating holes among the grating holes is greater than a diameter of the remaining grating holes and than the predetermined grating constant, said pair of grating holes being opposed with respect to the core and disposed near the core, and at least one of said pair of grating holes having its inside covered with a multilayer composed of two types of media that have different refractive indices and are stacked alternatively.

5. The absolutely single-polarization optical fiber as claimed in claim 4, wherein said cladding is a photonic crystal cladding.

6. The absolutely single-polarization optical fiber as claimed in claim 4, wherein a sum of the diameter of said pair of grating holes and the diameter of the remaining grating holes is less than twice the predetermined grating constant.

7. The polarization-maintaining optical fiber as claimed in claim 1, wherein the core has an elliptical Ge-doped area.

* * * * *